United States Patent [19]

Hama

[11] Patent Number: 4,890,132
[45] Date of Patent: Dec. 26, 1989

[54] MANUAL CONTROL APPARATUS OF ZOOM LENS BARREL FOR AN AUTO FOCUS CAMERA

[75] Inventor: Yoshihiro Hama, Tokyo, Japan

[73] Assignee: Asahi Kogaku Kogyo Kabushiki Kaisha, Tokyo, Japan

[21] Appl. No.: 171,748

[22] Filed: Mar. 22, 1988

[30] Foreign Application Priority Data

| Mar. 26, 1987 | [JP] | Japan | 62-73822 |
| Mar. 26, 1987 | [JP] | Japan | 62-73823 |
| Mar. 26, 1987 | [JP] | Japan | 62-45054[U] |
| Aug. 10, 1987 | [JP] | Japan | 62-200311 |

[51] Int. Cl.$^4$ .......................... G03B 3/00; G03B 5/00; G02B 15/00; G02B 7/02
[52] U.S. Cl. .............................. 354/400; 354/195.12; 350/429; 350/255
[58] Field of Search ................ 354/400, 195.1, 195.12; 350/429, 430, 255

[56] References Cited

U.S. PATENT DOCUMENTS

| B 315,828 | 1/1975 | Uesugi | 350/429 |
| 3,915,557 | 10/1975 | Shinojima | 350/255 X |
| 4,089,590 | 5/1978 | Sakata | 350/255 X |
| 4,322,150 | 3/1982 | Kamata et al. | 350/255 X |
| 4,457,591 | 7/1984 | Muryoi et al. | 350/255 X |
| 4,488,787 | 12/1984 | Osawa | 350/429 |
| 4,671,622 | 6/1987 | Rossman | 350/430 |
| 4,720,182 | 1/1988 | Imanari | 350/430 |

*Primary Examiner*—W. B. Perkey
*Attorney, Agent, or Firm*—Sandler & Greenblum

[57] ABSTRACT

A manual control apparatus is provided on the zoom lens barrel for an auto focus type camera to allow manual focusing and zooming control. A zoom lens group and a focusing lens group are provided inside the lens barrel in such a manner that each of the lens groups can be independently moved back and forth along the optical axis thereof, and further a zooming mechanism and a focusing mechanism are respectively provided to move the zoom lens group and the focusing lens group back and forth along the optical axis. By changing over the manual control apparatus, the zoom lens group and the focusing lens group can be selectively moved back and forth one group at a time.

26 Claims, 13 Drawing Sheets

MANUAL CONTROL APPARATUS OF ZOOM LENS BARREL FOR AN AUTO FOCUS CAMERA

BACKGROUND OF THE INVENTION

1. Field of the Invention

The present invention relates to a manual control apparatus provided on a zoom lens barrel for an auto focus type camera to allow manual focusing and zooming control.

2. Description of the Related Art

Generally, an auto focus type camera has a motor for moving back and forth a group of photographic lenses in the direction of the optical axis thereof, wherein automatic focusing is performed by controlling rotation of the motor in accordance with the range of distance from an object. Manual focusing is, however, required in some circumstances. To meet such a requirement, therefore, a manual control ring is also provided on the lens barrel of a camera, so that rotational operation of the control ring moves the photographic lenses in the direction of the optical axis thereof, whereby manual focusing is enabled.

With a zoom lens barrel, in addition to the manual control ring, a zoom control ring is provided for controlling zooming by hand.

In such a device, since it is connected to the photographic lenses at all times, a manual focusing control ring is also made to rotate together with the lenses when the auto focus starts to operate. Consequently, if the user's hand is touching the manual control ring at that time, the motor and intermediary connecting members have a tremendous load imposed thereon, which disadvantageously causes failure and malfunction in focusing. In most cases, in order to avoid this, the manual control ring is disposed at such a position that it is most unlikely that the ring will be carelessly touched by the hand. But this results in another disadvantage in that manual control of the ring is very difficult when it is needed.

Also with an interchangeable lens having a long lens barrel such as a telephoto lens, a member for covering a manual control ring is often provided so as to avoid careless touching of the ring by the hand. With a device of this type, however, the member must be separately provided and be made longer and larger than the control ring, which needs to be a certain length from the viewpoint of controllability of the ring when it needs to be manually controlled. This means that the lens barrel must be made larger, which makes it difficult to take photos while the camera is being held by the hand. In addition, since the motor is forced to rotate the large manual control ring during automatic focusing operation, it has an enormous load imposed thereon, which results in a further disadvantage in that a remarkable reduction of the life of the motor is caused by this.

SUMMARY OF THE INVENTION

An object of the present invention is to provide a manual control apparatus of a zoom lens barrel which shows good controllability when manual focusing is performed, and which further prevents a motor from having an enormous load imposed thereon while the auto focus is operating.

Other objects and advantages of the present invention will become apparent from the following detailed description of an illustrated embodiment of the invention.

According to the present invention, there is provided a manual control apparatus of a zoom lens barrel for an auto focus camera comprising a lens barrel having a focusing lens group and a zoom lens group, each of the groups being enabled to be independently moved back and forth along the optical axis thereof; a zooming mechanism for moving the zoom lens group back and forth along the optical axis thereof; a focusing mechanism for moving the focusing lens group back and forth along the axis thereof; and a manual control device for selectively moving back and forth either the zoom lens group or the focusing lens group through its engagement either with the zooming mechanism or with the focusing mechanism when the manual control device is changed over.

BRIEF DESCRIPTION OF THE DRAWINGS

The present invention may be more fully understood from the preferred embodiment of the invention set forth below, together with the accompanying drawings, in which.

DESCRIPTION OF THE PREFERRED EMBODIMENT

Figure 1:
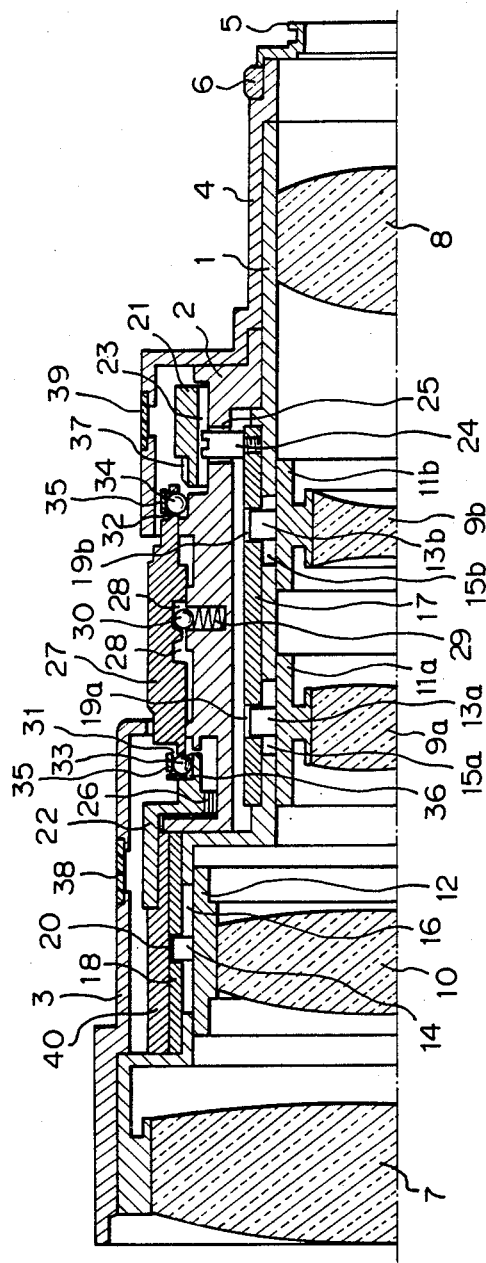
FIG. 1 is a side sectional view of the upper half portion of the first embodiment of the present invention, the lower half, portion of which is omitted.

FIG. 1 is a sectional view of the upper half portion of the first embodiment of the present invention, the lower half portion thereof being omitted.

Reference numeral 1 denotes an inside main body and reference numeral 2 denotes an outside main body. Fixed on the outmost surface thereof are a front side cover 3 and a rear side cover 4. Reference numeral 5 denotes a bayonet claw fixed to the rear end portion of a lens barrel for engaging a mount of a camera body and reference numeral 6 denotes an aperture ring for controlling an aperture area of a diaphragm aperture, which is not illustrated in the drawing.

In the inside main body 1 fixed lens groups 7 and 8 are fixed, and between these lens groups a zoom lens group 9 composed of a front group 9a and a rear group 9b, and a focusing lens group 10 are respectively fixed in lens frames 11a, 11b and 12, which are disposed in such a way as to move back and forth along the optical axis of the lenses. These lens frames 11a, 11b and 12 are respectively provided with pins 13a, 13b and 14 in such a way as to project therefrom and to extend through elongate holes 15a, 15b and 16 which are formed longitudinally along the optical axis of the lenses. Over the outer periphery of the inside main body 1 a zooming cam barrel 17 and a focusing cam barrel 18 are fitted rotatably, and the pins 13a, 13b and 14 are made to respectively engage cams 19a, 19b and 20, which are formed on the respective cam barrels 17 and 18.

With this construction, rotation of the zooming cam barrel 17 in either direction moves the zoom lens groups 9a and 9b back and forth along the optical axis for zooming operation, and rotation of the focusing cam barrel 18 in either direction moves the focusing lens unit 10 back and forth along the optical axis for focusing operation.

Over the periphery of the outside main body 2 a zooming operation barrel 21 and a focusing operation barrel 22 are fitted rotatably. Formed in the inner surface of the zooming operation barrel 21 is a groove 23, which is engaged by the head portion of a screw 24 provided on the cam barrel 17 in such a way as to stand erect therefrom, whereby the cam barrel 17 and the zooming barrel 21 are designed to rotate together with the aid of the screw 24.

Reference numeral 25 denotes a slit formed in the outside main body 2 in the circumferential direction thereof, through which the screw 24 extends. The focusing operation barrel 22 is integrally connected to the focusing cam barrel 18 through a connecting barrel body 40 by utilizing a screw (not shown), whereby the focusing operation barrel 22 and the cam barrel 18 are designed to rotate together.

As described above, a zooming mechanism is composed of the zooming cam barrel 17, the zooming operation barrel 21 and the like, a focusing mechanism being composed of the focusing cam barrel 18, the focusing operation barrel 22 and the like. On the inner peripheral side of the focusing operation barrel 22 an inner toothed gear 26 is also formed for engagement with a joint gear 103 (shown in FIG. 20) which is driven by a motor 102 for auto focus operation. Whereby the focusing operation barrel 22 is driven by the motor 102 for auto focus operation.

Figure 6:
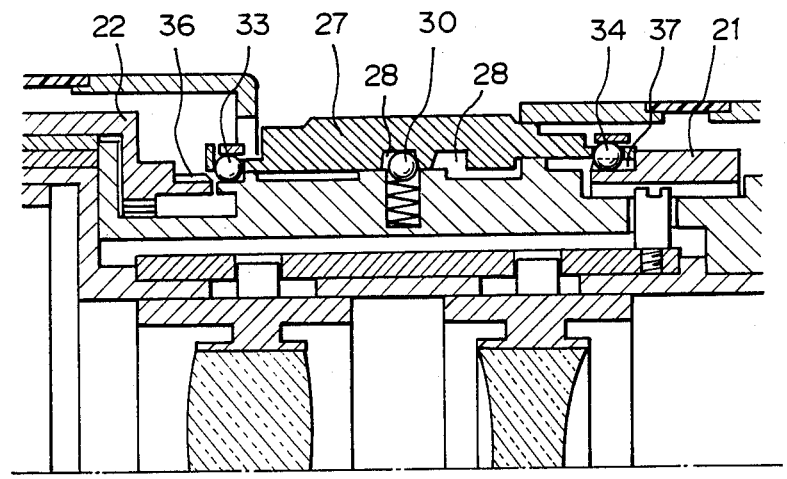
FIG. 6 is a partial sectional view of the upper half portion of the first embodiment, the lower half portion of which is omitted, showing a condition wherein the manual control ring is moved from the position shown in FIG. 1.

Over the periphery of the central portion of the outside main body 2 a manual control ring 27 is rotatably fitted. The manual control ring 27 is also so arranged as to move back and forth along the optical axis. In the lower side surface and substantially at the longitudinally central portion of the manual control ring 27 a pair of parallel grooves 28 separated by a projection are formed in the circumferential direction thereof, and a click ball 30 is biased away from the outside main body 2 side by a coil spring 29 for engagement with either of the grooves 28, whereby the axial position of the manual control ring 27 is set in such a groove position by virtue of the effect of the click-and-groove engagement. FIGS. 1 and 6 show respectively a condition wherein the manual control ring 27 is positioned at the front (left-hand side as viewed in the drawing) and a condition wherein the ring 27 is positioned at the rear (right-hand side as viewed in the drawing).

Provided at the positions adjacent to the left and right ends of the manual control ring 27 are holes 31 and 32, in which steel balls 33 and 34 are fitted as engaging members. These steel balls 33 and 34 consisting, for example, of six balls at each end, are provided on the circumference of the manual control ring 27 at regular intervals and are pressed inwardly by a ring-like plate spring 35 disposed on the outer periphery of the balls.

Figure 2:
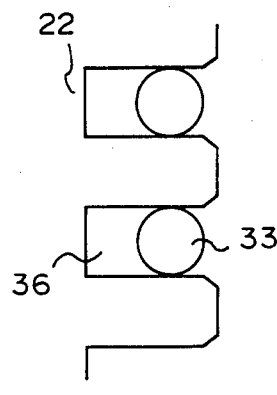
FIG. 2 is an enlarged plane view showing the engaging relationship of the engaging members and the grooves of the first embodiment.
Figure 3:
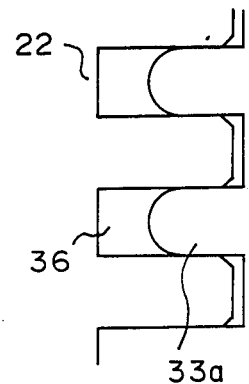
FIGS. 3, 4 and 5 are enlarged plane views showing the relationship of the engaging members and the grooves of each of the other embodiments.
Figure 4:
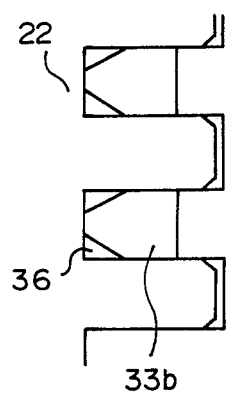
Figure 5:
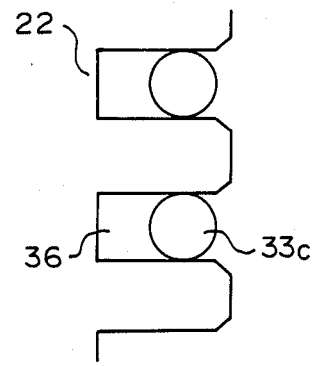

Formed at regular intervals around the outer periphery of the focusing operation barrel 22 are many grooves 36, with which the steel balls 33 are brought into engagement when the manual control ring 27 is placed at the left-hand side position; such an engagement of the grooves 36 with the balls 33 is shown in FIG. 2. With the above construction, the grooves 36 and the balls 33 are capable of being brought into engagement with one another wherever the manual control ring 27 is rotated to be positioned. Also, the same kind of grooves 37 are formed around the zooming operation barrel 21 in the same manner so that the steel balls 34 can be brought into engagement therewith when the manual control ring 27 is, as shown in FIG. 6, placed at the rear position (right-hand side as viewed in the drawing). As for the connecting members, substitutes for the steel balls can have such shapes as a semi-cylinder 33a, a polygonal post 33b, a cylinder 33c, and so forth, as shown respectively in FIGS. 3, 4 and 5.

Reference numerals 38 and 39 denote windows with plastic sheeting allowing range scales and zooming scales provided respectively on the outer periphery of the focusing operation barrel 22 and the zooming operation barrel 21 to be viewed from the outside.

Figure 20:
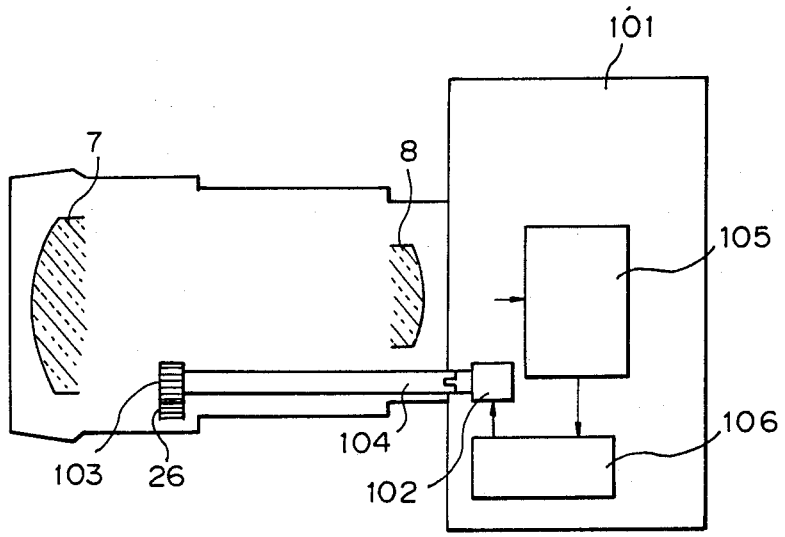
FIG. 20 is a block diagram of an auto focus apparatus for use in each embodiment.

FIG. 20 is a block diagram of an automatic focusing apparatus provided inside a camera body 101, the apparatus comprising a motor 102 connected to the joint gear 103 through a drive shaft 104, a focus detector 105 for detecting the best focus point through a light image that has passed through groups of the lenses, and a motor control device 106 for controlling rotation of the motor 102 through output signals from the focus detector 105.

With the apparatus of this embodiment constructed as described above, when it is, as shown in FIG. 1, moved to the front position where it is set (left-hand side as viewed in the drawing), the manual control ring 27 is brought into engagement with the focusing operation barrel 22 through the steel balls 33 and the grooves 36, whereby rotation of the manual control ring 27 in either direction moves the focusing lens unit 10 back and forth along the optical axis to thereby enable manual focusing control to be performed. During this operation, the manual control ring 27 is disengaged from the zooming operation barrel 21, the zooming mechanism thus being inactivated.

In contrast, when the manual control ring 27 is, as shown in FIG. 6, moved to the rear position (right-hand side as viewed in the drawing), the balls 34 are brought into engagement with the grooves 37 formed on the zooming operation barrel 21, whereby rotation of the manual control ring 27 in either direction moves the zoom lens group 9a and 9b back and forth along the optical axis to thereby enable the zooming operation to be performed. During such a zooming operation, the manual control ring 27 is this time disengaged from the focusing operation barrel 22, the manual control ring 27 thus being kept free from the influence of the movement of the motor during auto focus operation.

Shown in FIGS. 7 to 15 is the second embodiment of the present invention, wherein a focus limiter mechanism for limiting the range of operation of the focusing mechanism is additionally provided in the focusing mechanism of the embodiment shown in FIG. 1. The second embodiment includes all the components of the embodiment shown in FIG. 1, and the same reference numerals are given to those components, no description thereof being given herein.

Figure 12:
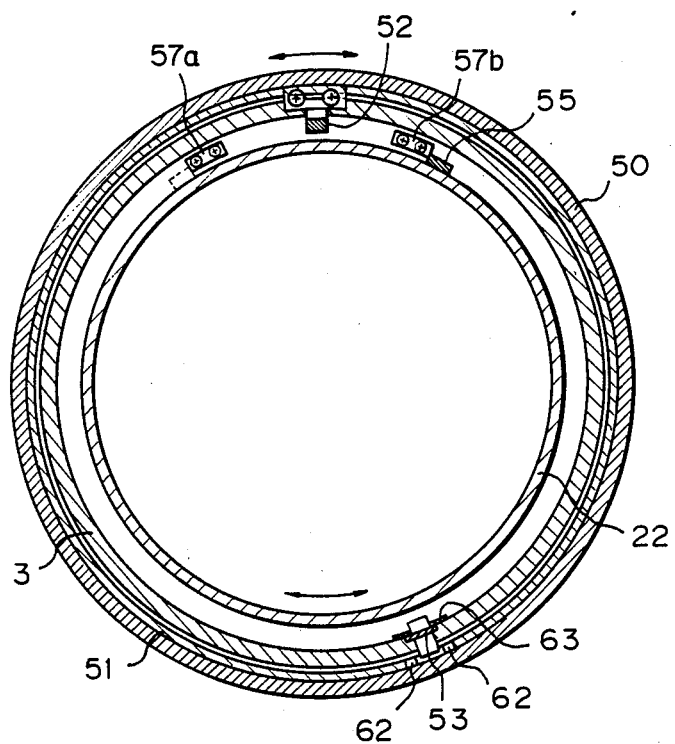
FIG. 12 is a front sectional view of the focus limiter mechanism of the second embodiment.
Figure 13:
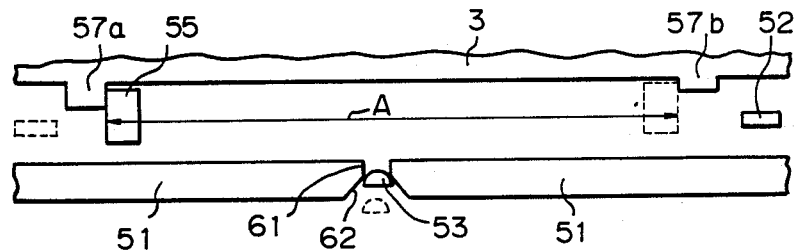
FIGS. 13, 14 and 15 are exploded views showing the relationship between the focus limiter mechanism and the disengagement mechanism of the second embodiment.

The focus limiter mechanism of the second embodiment is intended to limit the operation of the focusing mechanism which operates within the range from a near point to infinity to within a range either from a near point to a given range of distance or from a given range of distance to infinity, and when the focus limiter mechanism is not in operation, the focusing mechanism is freely operative within the range from a near point to infinity. In the focusing mechanism of this embodiment, as shown in FIG. 12, a stopper plate 55 is secured to the outside of the focusing operation barrel 22. This stopper plate 55, as shown in FIGS. 13, 14 and 15, moves between a near point side stopper projection 57a and an infinity side stopper projection 57b, both of which are provided on the front side cover 3.

In the focus limiter mechanism of this embodiment, a position-adjustable limit lever 52 is provided to collide against the stopper plate 55 between the stopper projections 57a and 57b. To be more specific, when the limit lever 52 is, as shown in FIG. 13, positioned outside the operational range of the stopper plate 55 restricted by the near point side stopper projection 57a and the infinity side stopper projection 57b (such a location of the limit lever 52 is shown in FIG. 12.), the stopper plate 55 can freely move between the stopper projections 57a and 57b (as shown by an arrow "A" in FIG. 13).

Figure 14:
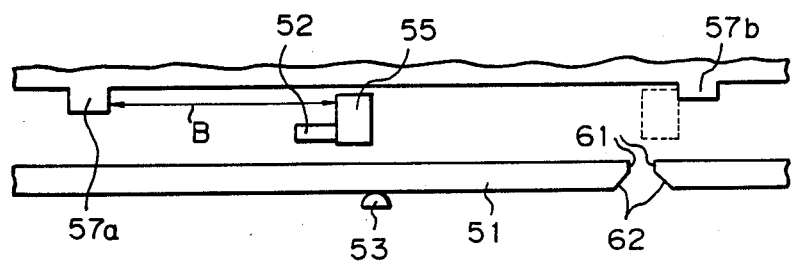
Figure 15:
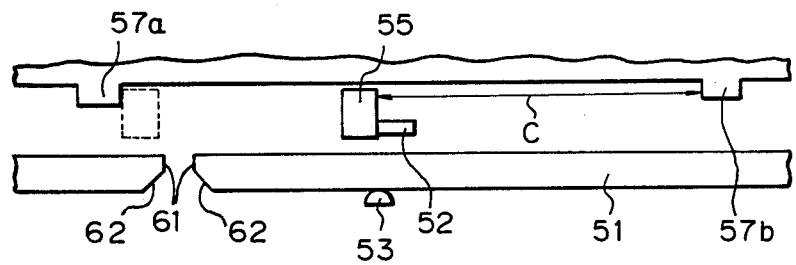

As shown in FIG. 14, when the limit lever 52 is so positioned as to be fixed between the stopper projections 57a and 57b, and when the stopper plate 55 is positioned to move between the near point side stopper projection 57a and the limit lever 52, the focusing mechanism is permitted to operate within the range from a near point to a given range of distance restricted by the location of the limit lever 52 (as shown by an arrow "B" in FIG. 14). Similarly, as shown in FIG. 15, when the stopper plate 55 is positioned to move between the infinity side stopper projection 57b and the limit lever 52, focusing control is attained within the range from a given range of distance to infinity (as shown by an arrow "C" in FIG. 15).

Figure 7:
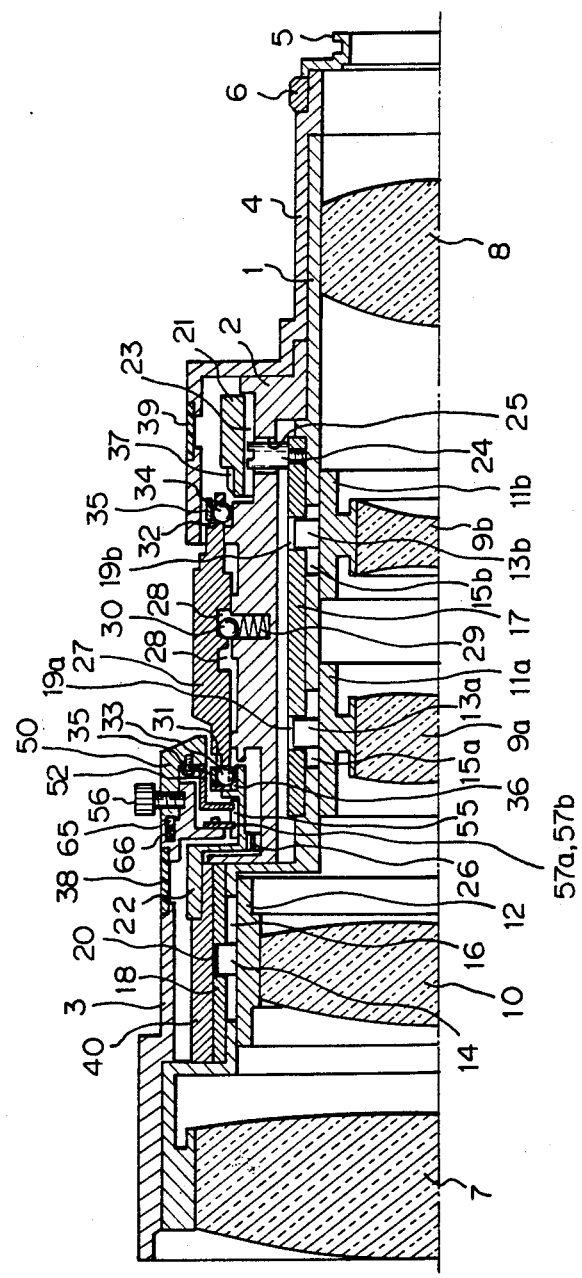
FIG. 7 is a side sectional view of the upper half portion of the second embodiment of the present invention, the lower half portion of which is omitted.

With this apparatus, the limit lever 52 is, as shown in FIG. 7, fixed to the inside of a focus limiter control ring 50, which is rotatably fitted over the outside of the front side cover 3, and rotation of the focus limiter control ring 50 in either direction enables the limit lever 52 to be set at a desired position. Also provided on the focus limiter control ring 50 are a thrust ring 51 (shown in FIGS. 8 and 10) for restricting the movement of the manual control ring 27 along the optical axis and a lock nut 56 for locking the focus limiter control ring 50 to the front side cover 3 at a desired rotational position thereof. Also formed in the focus limiter control ring 50 is a hole 67 (shown in FIG. 10) in which a click ball 65 biased away from the front side cover 3 by a coil spring 66 is designed to fit so as to click-stop the focus limiter control ring 50 from rotating when the focus limiter is positioned to be out of action.

Therefore, with this focus limiter mechanism, the limit lever 52 can be set and fixed at an optional position between the two stopper projections 57a and 57b by rotating the focus limiter control ring 50 in one direction or the other and tightening the lock nut 56 to secure the limit lever at such an optional point, whereby the focus limiter can be fully controlled to be located at an optional point within the range from a near point to infinity. Also, when the focus limiter does not need to be operated, the focus limiter control ring 50 can be kept click stopped.

Further, with this embodiment, a disengagement mechanism for disengaging the manual control ring 27 from the focusing mechanism is provided for use in a case wherein the manual control ring 27 is in engagement with the focusing mechanism side when the focus limiter mechanism is activated.

Figure 8:
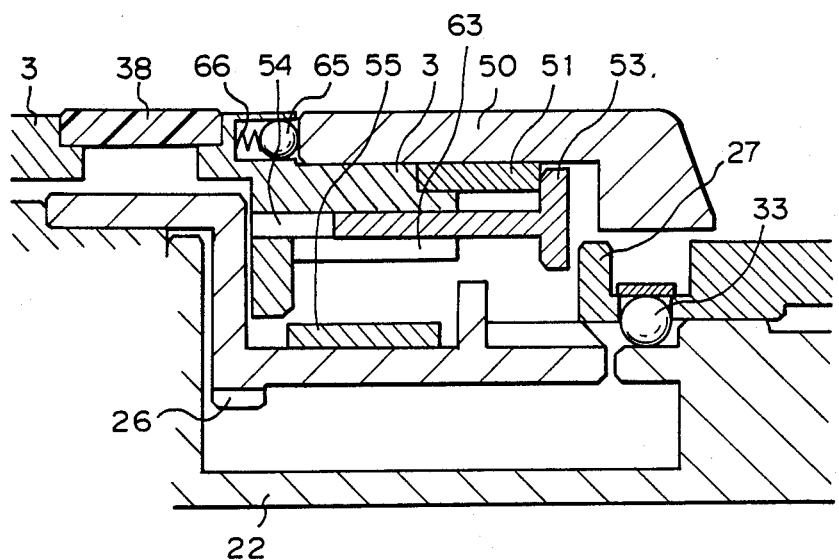
FIGS. 8 and 9 are respectively a partially enlarged side sectional view and a partially enlarged plan view each showing a condition wherein the focus limiter of the second embodiment is operated.
Figure 9:
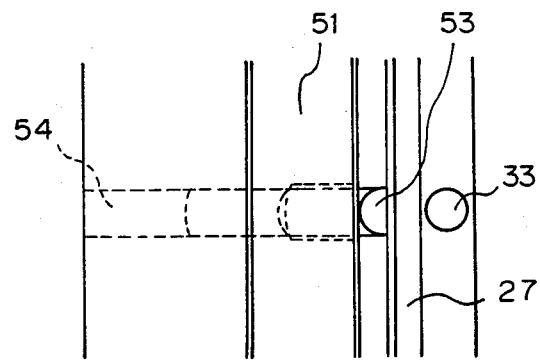
Figure 10:
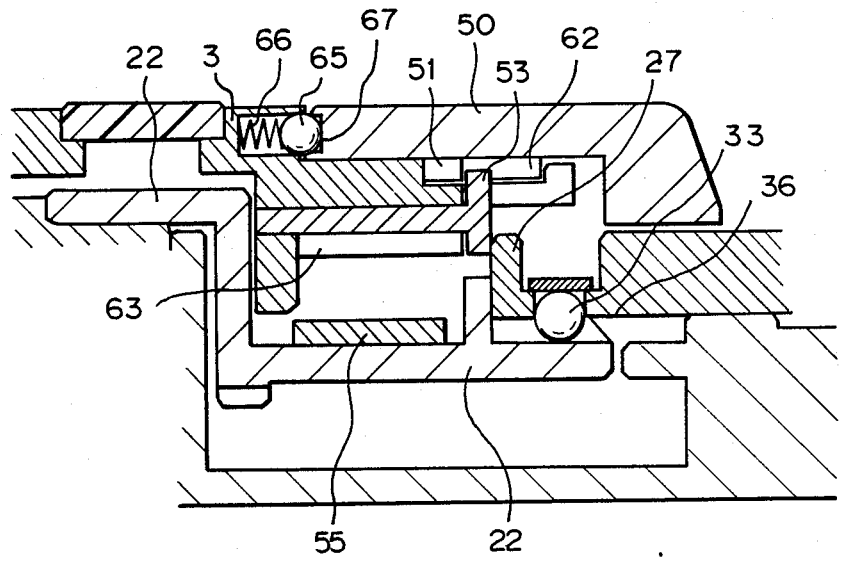
FIGS. 10 and 11 are respectively a partially enlarged sectional view and a partially enlarged plan view each showing a condition wherein the focus limiter of the second embodiment is released.
Figure 11:
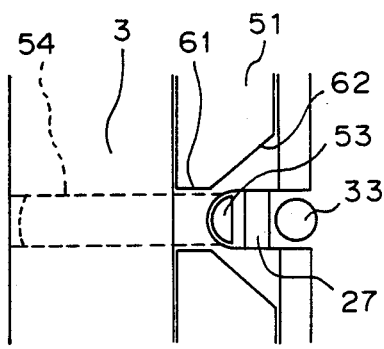

As shown in FIGS. 9 and 11, the disengagement mechanism is composed of a slit 61 formed along the optical axis in the lower part of the thrust ring 51 and is made to expand toward the rear part thereof so as to form slopes 62, and a limit pin 53 for limiting the movement of the manual control ring 27. This limit pin 53 is, as shown in FIG. 11, fitted in a slide groove 54 and is constructed so as to move along the optical axis therein. But the limit pin 53 is permitted to fit in the slit 61 formed in the thrust ring 51 and is thereby enabled to move forward only when the focus limiter control ring 50 is, as shown in FIG. 10, moved to be located at a position wherein it is click-stopped (a position wherein the focus limiter is out of action). Therefore, only at this position is the manual control ring 27 permitted to engage the focusing mechanism. And as shown in FIGS. 8 and 9, the limit pin 53 is prevented from moving forward by the thrust ring 51 in other cases, wherein the control ring 27 is not prevented from moving forward for engagement with the focusing mechanism. Reference numeral 63 denotes a guide.

In contrast, in a condition wherein the above described limit pin 53 is fitted in the slit 61 (a condition wherein manual control is available with the focus limiter out of action), when the focus limiter control ring 50 is rotated in one direction or the other to activate the focus limiter mechanism, the pin 53 is guided along the slopes 62 of the slide groove to be eventually moved rearwardly. Due to this, therefore, even if the manual control ring 27 engages the focusing mechanism, the manual control ring 27 is pressed rearwardly by the limit pin 53, whereby the manual control ring 27 is disengaged from the focusing mechanism.

Although in the above embodiment one type of construction is explained as being one example of the focus limiter mechanism wherein the limit lever is set and fixed at an optional position between the two stopper projections, this construction can be replaced by others.

Further, although in the above embodiment the disengagement mechanism is composed of the slit provided in the thrust ring and the limit pin, the construction of the disengagement mechanism is not restricted to such a construction but can take any form so long as it is capable of disengaging the manual control ring from the focusing mechanism when the focus limiter starts to operate.

According to the second embodiment, the manual control ring is automatically disengaged from the focusing mechanism when the focus limiter is activated, and the auto focusing condition is thus attained in one operation, without any additional operation of the manual control ring. With this construction, therefore, the operation is very simple, and even if the manual control ring is mistakenly operated while the focus limiter is in operation, a manual focusing condition is not brought about.

FIGS. 16, 17, 18 and 19 show the third embodiment of the present invention wherein an engagement blocking device is provided for blocking the engagement of the manual control ring 27 with the focusing mechanism. The third embodiment includes all the components of the embodiment shown in FIG. 1, and in this embodiment also the same reference numerals are given to such components with no separate description thereof being given herein.

Figure 16:
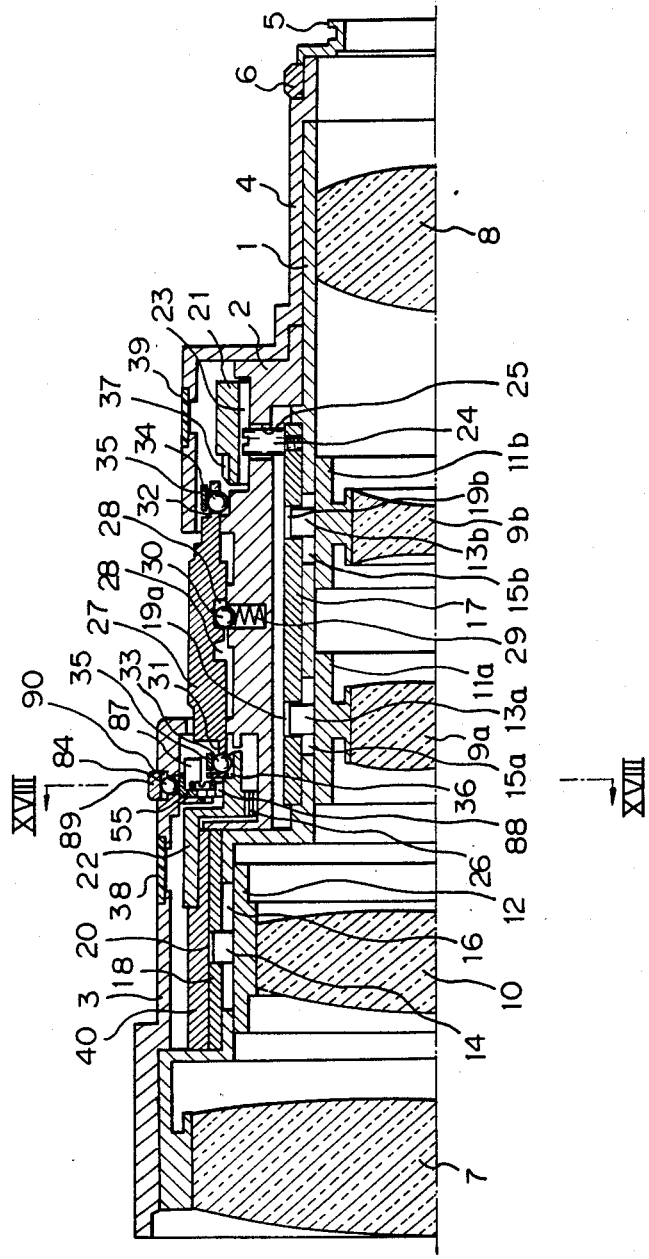
FIG. 16 is a side sectional view of the upper half portion of the third embodiment of the present invention, the lower half portion of which is omitted.
Figure 18:
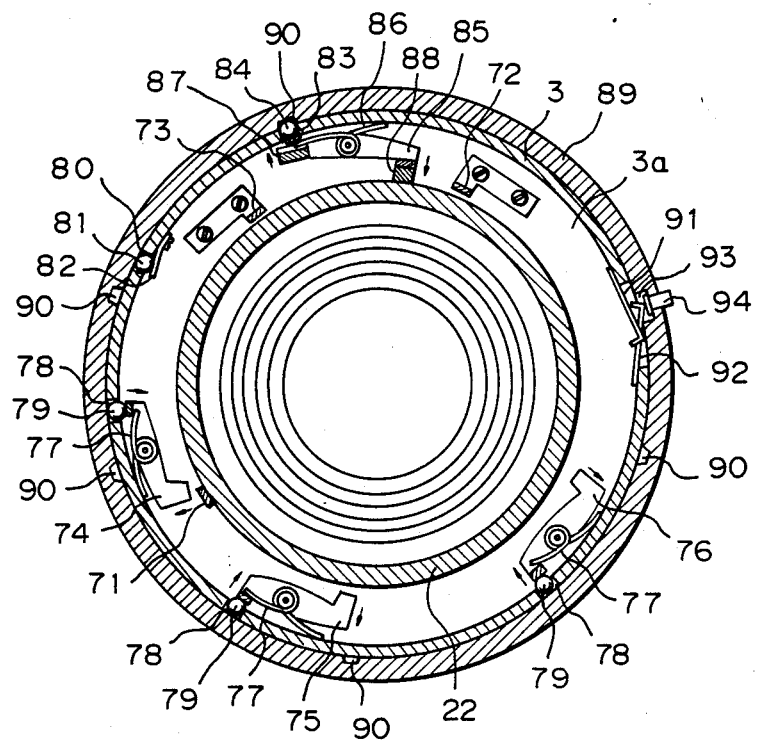
FIG. 18 is a cross sectional view taken along the line XVIII—XVIII of FIG. 16.

FIG. 18 is a sectional view taken along the line XVIII—XVIII of FIG. 16. A projection 71 is provided to be secured on the outside periphery of the focusing operation barrel 22, and is adapted to rotate together therewith. Fixed on a fixed wall 3a provided on the front side cover 3 so as to extend inwardly are a fixed stopper 72 for infinity and a fixed stopper 73 for a near point, and the projection 71 meets both fixed stoppers 72 and 73 when the focusing operation barrel 22 is rotated in one direction or the other, whereby the focusing operation barrel 22 is permitted to rotate therebetween.

Further, on the fixed wall 3a, a plurality of movable stoppers 74, 75 and 76 (three stoppers in this embodiment) are provided in the state of being kept from one another and between both fixed stoppers 72 and 73 in such a way as to rotate in one direction or the other. These movable stoppers are respectively biassed by springs 77 in the direction of rotation, and are kept pressed against balls 79 fitted in holes 78 provided in the front side cover. Also, at a different position on the front side cover 3 a ball 81 fitted in a hole 80 provided therein is pressed outwardly by a plate spring 82, and at another different position between the two fixed stoppers 72 and 73 a brake member 85, which is biassed clockwise by a spring 86, is mounted on the fixed wall 3a so as to rotate in one direction or the other. This brake member 85 is kept pressed against a ball 84 fitted in a hole 83 provided in the front side cover 3 all the time. Provided to be secured on the brake member 85 are a convex member 87 made to rearwardly extend to abut against the front end of the manual control ring 27, as shown in FIG. 17, and a brake pad 88 made to extend inwardly until it is pressed against the outside periphery of the focusing operation barrel 22 to thereby provide resistance to rotation of the focusing operation barrel 22, as shown in FIG. 18.

A changeover ring 89 is mounted on the outside periphery of the front side cover 3 in such a way as to rotate in one direction or the other. Formed apart from each ball in the inside peripheral surface of the changeover ring 89 are five grooves 90, with which the balls 79, 81 and 84 are respectively brought into engagement respectively. Reference numerals 91 and 92 denote plate springs, the proximate ends of which are secured on the front side cover 3 and the distal ends of which are bent substantially at right angles, reference numeral 93 denotes a groove, with which either of the distal ends of those plate springs 91 and 92 is brought into engagement (the distal ends of both plate springs 91 and 92 are not brought into engagement with the groove 93 at the same time.), and reference numeral 94 denotes a press button for disengaging such an engagement condition.

FIG. 18 shows a condition wherein the ball 84 pressed by the brake member 85 is in engagement with the groove provided in the changeover ring 89. In this condition, the brake member 85 is permitted to rotate clockwise to such an extent that the ball 84 is imbedded in the groove 90, whereby the convex member 87 is in turn raised to some degree, the convex member 87 and the manual control ring 27, as shown in FIG. 16, not meeting each other so as to allow the manual control ring 27 to freely move back and forth. In a condition wherein it is moved to be set at the front position (lefthand side position as viewed in FIG. 16), the manual control ring 27 is brought into engagement with the focusing operation barrel 22 through the steel balls 33 and the grooves 36, whereby rotation of the manual control ring 27 in either direction enables the focusing lens group 10 to move back and forth along the optical axis thereof, and the manual focusing is thus performed. At this time, since the manual control ring 27 is kept disengaged from the zooming operation barrel 21, the zooming mechanism is not activated.

Figure 17:
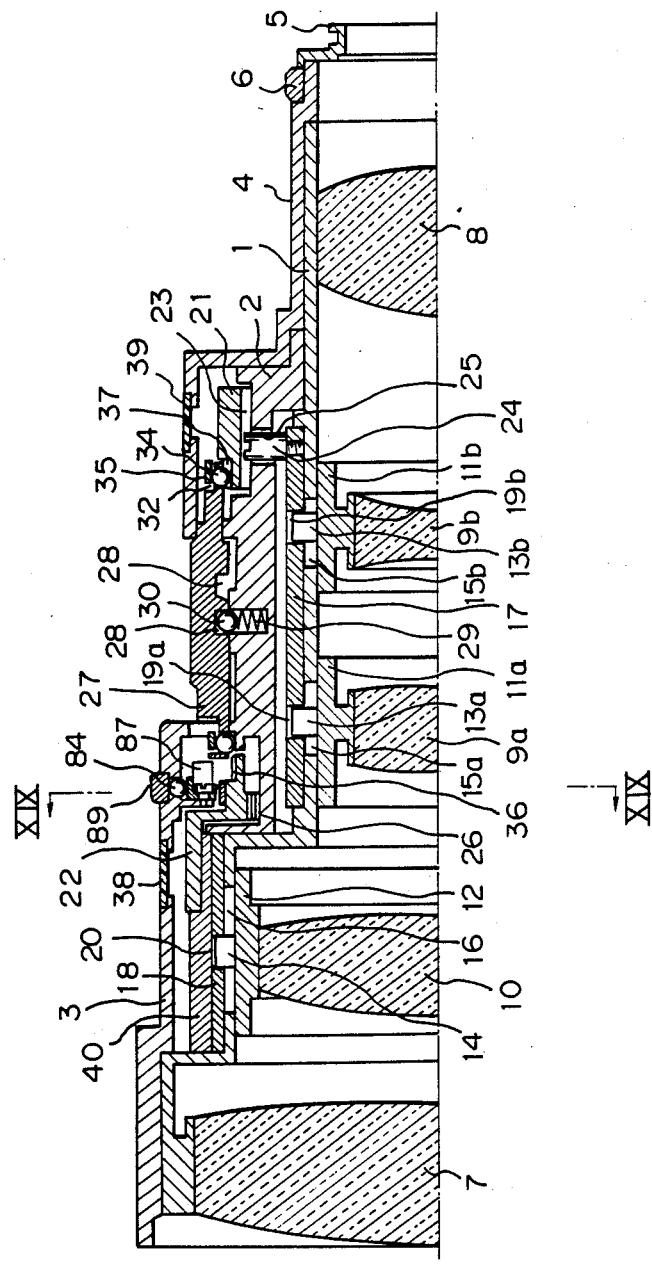
FIG. 17 is a side sectional view of the upper half portion of the third embodiment, the lower half portion of which is omitted, showing a condition wherein the manual control ring is operated.

In contrast to the above, when the manual control ring 27 is, as shown in FIG. 17, moved to be set at the rear position (right-hand side position as viewed in the drawing), the balls 34 are brought into engagement with the grooves 37, whereby rotation of the manual control ring 27 in either direction enables the zoom lens groups 9a and 9b to move back and forth along the optical axis thereof, so that the zooming operation is performed. At this time, since the manual control ring 27 is kept disengaged from the focusing operation barrel 22, movement of the focusing mechanism is cut off and is not transferred to the manual control ring 27 even when the focusing mechanism is activated by the auto focusing motor 102 (shown in FIG. 20), which ensures that no undue load is imposed upon the motor 102.

Returning to the condition shown in FIG. 18, that is, the condition wherein manual focusing is available, the brake pad 88 is lowered to be pressed against the outer peripheral surface of the focusing operation barrel 22 to thereby cause resistance against rotational movement of the barrel 22. This in turn creates resistance against the back and forth movement of the focusing lens group 10 of the photographic lenses, whereby the focusing lens group 10 is prevented from descending under its own weight even when the user holds his camera either upward or downward in a condition wherein the manual control ring 27 is in engagement with the zooming mechanism, the focusing mechanism being free from engagement with the manual control ring 27.

Referring again to FIG. 18, once the changeover ring 89 is rotated clockwise (to the auto focus condition) from the position shown in the drawing, the engagement of the ball 84 with the groove 90 is cancelled, but the plate spring 92 is then brought into engagement with the groove 93, the changeover ring 89 being unable to be rotated clockwise any further (but being able to be rotated counter-clockwise). However, once the press button 94 is pressed, this engagement is then cancelled, whereby the changeover ring 89 is enabled to be rotated clockwise. In a case wherein the changeover ring 89 is, after it has been rotated clockwise to create an auto focus condition, rotated counter-clockwise to restore the manual control condition, the ring 89 can be rotated in such a fashion until the plate spring 91 is brought into engagement with the groove 93 where counterclockwise rotation is unable to be attained any further (but being able to be rotated clockwise). Again, pressing the press button 94 at this point enables cancellation of this engagement, whereby the changeover ring 89 is enabled to be rotated further in the counter-clockwise direction. Thus, the press button 94 plays a critical role in changing over the operating conditions between a manual control and an auto focus condition.

Figure 19:
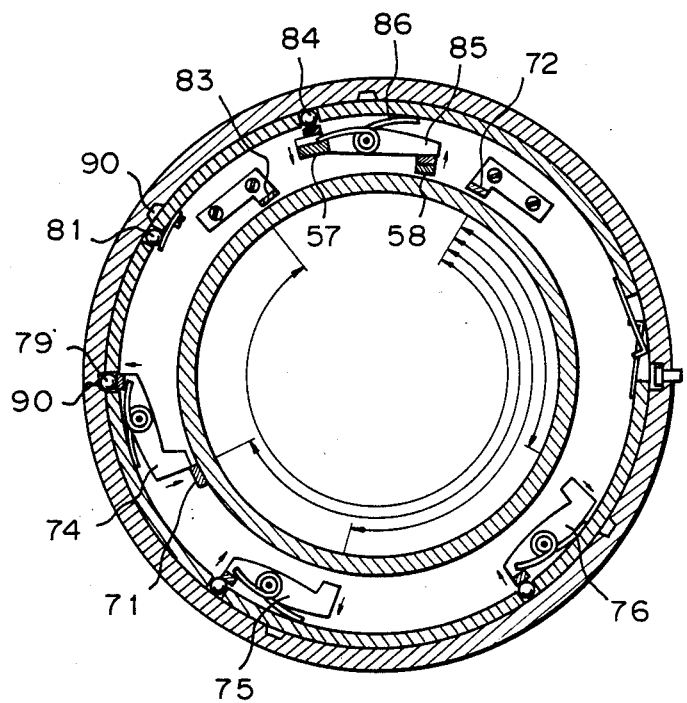
FIG. 19 is a cross sectional view taken along the line XIX—XIX of FIG. 17.

When rotating clockwise the changeover ring 89 set at the position shown in FIG. 18 with the press button 94 kept pressed, the ball 81 pressed by the plate spring 82 is brought into engagement with the groove 90, which causes an auto focus switch, which is not shown, to be immediately turned on. After the auto focus switch has been turned on, the brake member 85 is, as shown in FIG. 19, pressed back by the ball 84 and is made to rotate to a small degree in the counter-clockwise direction, the convex member 87 being in turn moved downward to a small degree, whereby the front end of the control ring 27 and the convex member 87 are, as shown in FIG. 17, brought into abutment with each other. Thus, engagement of the manual control ring 27 with the focusing mechanism is prevented in the focusing condition.

As described above, since the manual control ring 27 is prevented from engaging the focusing mechanism during the auto focusing operation, the manual control ring 27 is freed from the influence of the movement of the focusing mechanism even when the auto focusing starts to operate, whereby imposition of an enormous load upon the motor is prevented. Also, since the arrangement is such that an unexpected changeover from a zooming to a focusing condition will not be brought about during the auto focusing operation, the auto focus drive is protected against any possibility of damage occurring due to abrupt movement of the mechanisms. In addition, since the manual control ring 27 is designed not to rotate while the auto focusing is in operation, the ring 27 can be disposed at a position where the user can easily touch it so as to offer optimum controllability.

Also in the above condition, the brake pad 88 is raised to a small degree so as to be away from the peripheral surface of the focusing operation barrel 22, the resistance having been applied thereto thus being cancelled. In a condition wherein the ball 81 is in engagement with the groove 90, the arrangement of all the movable stoppers 74, 75 and 76 is, as shown in FIG. 18, such that they are brought into engagement with the projection 71, thereby allowing the projection 71 to move all the way between the fixed stoppers 73 and 72, which enables an auto focusing operation to be undertaken in the range from a near point (for example, 3.5 m) to infinity.

When going on to rotate the changeover ring 89 further in the clockwise direction, the ball 79 in abutment with the left-hand side movable stopper 74 is, as shown in FIG. 19, brought into engagement with the groove 90, that movable stopper 74 being made to rotate counter-clockwise to a small degree to thereby be located at a position where the projection 71 is brought into abutment therewith. Thus, the projection 71 is only allowed to move between the movable stopper 74 and the fixed stopper 72, whereby the range of the auto focusing operation is restricted to such as, for example, from 4.5 m to infinity.

Going on to rotate the changeover ring 89 further in the clockwise direction, the central movable stopper 75 is then brought to a position where it abuts against the projection 71, the range of the auto focusing operation thus being restricted to such as, for example, from 6 m to infinity.

Going on to rotate the changeover ring 89 still further in the clockwise direction, the right-hand side movable stopper 76 is then brought to a position where it abuts against the projection 71, the range of the auto focusing operation thus being restricted to such as, for example, 10 m to infinity.

With this construction described above, the range of the focusing operation is enabled to be optionally restricted according to the specific conditions subsisting when a photo is to be taken, which helps simplify the setting control of the focusing operation range as well as to obtain a quick focusing.

In addition, the number and location of the movable stoppers to be set depend on what kind of lenses are to be employed and optional determination of these factors can be undertaken accordingly. Moreover, the focusing operation range does not necessarily include infinity and can be properly determined according to the purpose for which the given lenses are to be utilized.

While the invention has been described by reference to a specific embodiment chosen for purposes of illustration, it should be apparent that numerous modifications could be made thereto by those skilled in the art without departing from the basic concept and scope of the invention.

I claim:

1. A manual control apparatus of a zoom lens barrel for a camera comprising:
    a lens barrel having a focusing lens group and a zoom lens group, each of the groups being enabled to be independently moved back and forth along the optical axis thereof;
    a zooming mechanism for moving said zoom lens group back and forth along the optical axis thereof;
    a focusing mechanism for moving said focusing lens group back and forth along the optical axis thereof; and
    manual control means for selectively moving back and forth either said zoom lens group for said focusing lens group through its engagement either with said zooming mechanism or with said focusing mechanism when said means is so changed over, said manual control means being mounted on said lens barrel so as to rotate to move both said zoom lens group and said focusing lens group back and forth.

2. A manual control apparatus of a zoom lens barrel for a camera according to claim 1, wherein said manual control means has a manual control ring provided on the outer periphery of said lens barrel so as to rotate thereon as well as to slide thereon in the axial direction.

3. A manual control apparatus of a zoom lens barrel for a camera according to claim 2, wherein said manual control ring is made to axially slide to one end or the other where it is brought into engagement either with said zooming mechanism or with said focusing mechanism.

4. A manual control apparatus of a zoom lens barrel for a camera according to claim 3, wherein said manual control ring has engagement members at one end thereof and said zooming mechanism has a plurality of grooves adapted to engage said engagement members.

5. A manual control apparatus of a zoom lens barrel for a camera according to claim 3, wherein said manual control ring has engagement members at one end thereof and said focusing mechanism has a plurality of grooves adapted to engage said engagement members.

6. A manual control apparatus of a zoom lens barrel for a camera according to claim 1, wherein said focusing mechanism has a focus limiter mechanism for restricting the operation range thereof.

7. A manual control apparatus of a zoom lens barrel for a camera according to claim 6, wherein said focusing mechanism has a disengagement mechanism for cancelling its engagement with said manual control means in synchronism with the operation of said focus limiter mechanism.

8. A manual control apparatus of a zoom lens barrel for a camera according to claim 7, wherein said disengagement mechanism is adapted not to cancel the engagement of said manual control means with said focusing mechanism while the operation range of said focusing mechanism is not being restricted by said focus limiter mechanism.

9. A manual control apparatus of a zoom lens barrel for a camera according to claim 8, wherein said disengagement mechanism is adapted to prohibit engagement of said manual control means with said focusing mechanism while the operation range of said focusing mechanism is restricted by said focus limiter mechanism.

10. A manual control apparatus of a zoom lens barrel for a camera according to claim 1, wherein the focusing mechanism is adapted to be connected to an auto focus motor of an auto focus camera.

11. A manual control apparatus of a zoom lens barrel for a camera comprising:
a lens barrel having a focusing lens group and a zoom lens group, each of the groups being enabled to be independently moved back and forth along the optical axis thereof,
a zooming mechanism for moving said zoom lens group back and forth along the optical axis thereof,
a focusing mechanism for moving said focusing lens group back and forth along the optical axis thereof,
manual control means for selectively moving back and forth either of said zoom lens group or said focusing lens group through its engagement either with said zooming mechanism or with said focusing mechanism when said means is so changed over, said manual control means being mounted on said lens barrel so as to rotate to move both said zoom lens group and said focusing lens group back and forth, and
engagement blocking means for blocking engagement of said manual control means with said focusing mechanism when said blocking means is so changed over.

12. A manual control apparatus of a zoom lens barrel for a camera according to claim 11, wherein said manual control means has a control ring provided on the outer periphery of said lens barrel so as to rotate thereon and to slide thereon in the axial direction.

13. A manual control apparatus of a zoom lens barrel for a camera according to claim 12, wherein said engagement blocking means has a stopper for preventing said manual control ring from sliding.

14. A manual control apparatus of a zoom lens barrel for a camera according to claim 13, wherein said engagement blocking means has a changeover ring rotatably provided on the outer periphery of said lens barrel for letting said stopper move into or out of the passage of said manual control ring through its rotation in either direction.

15. A manual control apparatus of a zoom lens barrel for a camera according to claim 11, wherein said engagement blocking means has a brake pad for creating resistance against movement of said focusing mechanism while said manual control means and said focusing mechanism are in engagement with each other.

16. A manual control apparatus of a zoom lens barrel for a camera according to claim 11, wherein said engagement blocking means has a stopper for restricting the operation range of said focusing mechanism while said manual control means and said focusing mechanism are prevented from engaging each other.

17. A manual control apparatus of a zoom lens barrel for a camera according to claim 14, wherein a plurality of said stoppers are provided to restrict the operation of said focusing mechanism to plural stages.

18. A manual control apparatus of a zoom lens barrel for a camera according to claim 10, wherein the focusing mechanism is adapted to be connected to an auto focus motor of an auto focus camera.

19. A manual control apparatus of a zoom lens barrel for a camera comprising;
a lens barrel having focusing lens group and a zoom lens group, each of the groups being enabled to be independently moved back and forth along the optical axis thereof;
a zooming mechanism for moving said zoom lens group back and forth along the optical axis thereof;
a focusing mechanism for moving said focusing lens group back and forth along the optical axis thereof; and
manual control means for selectively moving back and forth either said zoom lens group or said focusing lens group through its engagement either with said zooming mechanism or with said focusing mechanism when said means is so changed over, said manual control means including a manual control ring provided on the outer periphery of said lens barrel so as to rotate thereon as well as slide thereon in the axial direction along a path having two ends, said manual control ring is made to axially slide to one end or the other where it is brought into engagement either with said zooming mechanism or with said focusing mechanism.

20. A manual control apparatus of a zoom lens barrel for a camera according to claim 19, wherein said manual control ring has engagement members at one end thereof and said zooming mechanism has a plurality of grooves adapted to engage said engagement members.

21. A manual control apparatus of a zoom lens barrel for a camera according to claim 19, wherein said manual control ring has engagement members at one end thereof and said focusing mechanism has a plurality of grooves adapted to engage said engagement members.

22. A manual control apparatus of a zoom lens barrel for a camera comprising:

a lens barrel having a focusing lens group and a zoom lens group, each of the groups being enabled to be independently moved back and forth along the optical axis thereof;

a zooming mechanism for moving said zoom lens group back and forth along the optical axis thereof;

a focusing mechanism for moving said focusing lens group back and forth along the optical axis thereof;

manual control means for selectively moving back and forth either said zoom lens group or said focusing lens group through its engagement either with said zooming mechanism or with said focusing mechanism when said means is so changed over; and said focusing mechanism including a focus limiter mechanism for restricting the operation range thereof and a disengagement mechanism for cancelling its engagement with said manual control means in synchronism with the operation of said focus limiter mechanism.

23. A manual control apparatus of a zoom lens barrel for a camera according to claim 22, wherein said disengagement mechanism is adapted not to cancel the engagement of said manual control means with said focusing mechanism while the operation range of said focusing mechanism is not being restricted by said focus limiter mechanism.

24. A manual control apparatus of a zoom lens barrel for a camera according to claim 23, wherein said disengagement mechanism is adapted to prohibit engagement of said manual control means with said focusing mechanism while the operation range of said focusing mechanism is restricted by said focus limiter mechanism.

25. A manual control apparatus of a zoom lens barrel for a camera comprising:

a lens barrel having a focusing lens group and a zoom lens group, each of the groups being enabled to be independently moved back and forth along the optical axis thereof;

a zooming mechanism for moving said zoom lens group and forth along the optical axis thereof;

a focusing mechanism for moving said focusing lens group back and forth along the optical axis thereof;

manual control means for selectively moving back and forth either said zoom lens group or said focusing lens group through its engagement either with said zooming mechanism or with said focusing mechanism when said means is so changed over, said manual control means including a manual control ring provided on the outer periphery of said lens barrel so as to rotate thereon and to slide thereon in an axial direction; and engagement blocking means for blocking engagement of said manual control means with said focusing mechanism when said blocking means is so changed over, said engagement blocking means including a stopper for preventing said manual control ring from sliding and a changeover ring rotatably provided on the outer periphery of said lens barrel for letting said stopper move into or out of the passage of said manual control ring through its rotation in either direction.

26. A manual control apparatus of a zoom lens barrel for a camera comprising:

a lens barrel having a focusing lens group and a zoom lens group, each of the groups being enabled to be independently moved back and forth along the optical axis thereof;

a zooming mechanism for moving said zoom lens group back and forth along the optical axis thereof;

a focusing mechanism for moving said focusing lens group back and forth along the optical axis thereof;

manual control means for selectively moving back and froth either said zoom lens group or said focusing lens group through its engagement either with said zooming mechanism or with said focusing mechanism when said means is so changed over; and engagement blocking means for blocking engagement of said manual control means with said focusing mechanism when said blocking means is so changed over, said engagement blocking means including brake pad for creating resistance against movement of said focusing mechanism while said manual control means and said focusing mechanism are in engagement with each other.

* * * * *

UNITED STATES PATENT AND TRADEMARK OFFICE
CERTIFICATE OF CORRECTION

PATENT NO. : 4,890,132

DATED : December 26, 1989

INVENTOR(S) : Y. HAMA

It is certified that error appears in the above-identified patent and that said Letters Patent is hereby corrected as shown below:

Column 5, line 9, change "group" to ---groups---.
Column 12, line 25, change "14" to ---16---.
Column 12, line 29, change "10" to ---11---.
Column 12, line 35, insert ---a--- after "having".
Column 14, line 31, change "froth" to ---forth---; and
Column 14, line 40, insert ---a--- after "including".

Signed and Sealed this

Eighteenth Day of June, 1991

Attest:

HARRY F. MANBECK, JR.

*Attesting Officer*      *Commissioner of Patents and Trademarks*